United States Patent [19]

Bubar

[11] Patent Number: 6,126,977
[45] Date of Patent: *Oct. 3, 2000

[54] METHOD OF MAKING LAMINATED PIZZA CRUST

[75] Inventor: Ronald O. Bubar, Jackson, Ohio

[73] Assignee: Jeno F. Paulucci, Sanford, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/968,900

[22] Filed: Nov. 6, 1997

Related U.S. Application Data

[63] Continuation of application No. 08/496,894, Jun. 30, 1995, abandoned.

[51] Int. Cl.⁷ ................................... A21D 13/00
[52] U.S. Cl. .................. 426/275; 426/94; 426/283; 426/496; 426/502; 426/504
[58] Field of Search ................... 426/94, 275, 283, 426/289, 502, 504, 496

[56] References Cited

U.S. PATENT DOCUMENTS

| | | | |
|---|---|---|---|
| D. 251,895 | 5/1979 | Belmuth et al. | D9/182 |
| D. 277,044 | 1/1985 | Kuhlman | D1/130 |
| D. 339,899 | 10/1993 | Kittleson | D1/122 |
| 628,449 | 7/1899 | Carr . | |
| 969,173 | 9/1910 | Loose . | |
| 1,174,826 | 3/1916 | Chapman . | |
| 1,179,294 | 4/1916 | Embrey . | |
| 1,646,921 | 11/1927 | Loose . | |
| 2,089,396 | 8/1937 | Meilstrup | 107/54 |
| 2,509,035 | 5/1950 | Corbett | 99/92 |
| 2,668,767 | 2/1954 | Lowe | 99/92 |
| 3,143,424 | 8/1964 | Wilson | 99/1 |
| 3,235,390 | 2/1966 | Vischer, Jr. | 99/194 |
| 3,677,769 | 7/1972 | King | 99/86 |
| 3,845,219 | 10/1974 | Federico | 426/19 |
| 3,880,069 | 4/1975 | Moline | 99/483 |
| 4,020,184 | 4/1977 | Chesner | 426/19 |
| 4,205,091 | 5/1980 | Van Horne | 426/138 |
| 4,283,424 | 8/1981 | Manoski et al. | 426/94 |
| 4,283,431 | 8/1981 | Giordano et al. | 426/296 |
| 4,308,286 | 12/1981 | Anstett et al. | 426/19 |
| 4,313,961 | 2/1982 | Tobia | 426/19 |
| 4,416,910 | 11/1983 | Hayashi et al. | 426/502 |
| 4,463,020 | 7/1984 | Ottenberg | 426/19 |
| 4,551,337 | 11/1985 | Schmit et al. | 426/94 |
| 4,574,090 | 3/1986 | Paulucci | 426/439 |
| 4,626,188 | 12/1986 | Morgenthaler et al. | 425/145 |
| 4,645,673 | 2/1987 | Wilmes | 426/94 |
| 4,661,361 | 4/1987 | Mongiello et al. | 426/283 |
| 4,696,823 | 9/1987 | DeChristopher | 426/496 |
| 4,753,813 | 6/1988 | Saadia | 426/283 |
| 4,842,882 | 6/1989 | Paulucci | 426/439 |
| 4,907,501 | 3/1990 | Rijkaart | 99/450.1 |
| 5,104,669 | 4/1992 | Wolke et al. | 426/94 |
| 5,180,603 | 1/1993 | Moriya et al. | 426/556 |
| 5,182,123 | 1/1993 | Edo et al. | 426/19 |
| 5,194,273 | 3/1993 | de Bruijne et al. | 426/94 |
| 5,196,223 | 3/1993 | Nakamura | 426/503 |
| 5,268,188 | 12/1993 | Diem et al. | 426/502 |
| 5,348,751 | 9/1994 | Packer et al. | 426/94 |
| 5,405,626 | 4/1995 | Van Der Graaf et al. | 426/94 |
| 5,417,150 | 5/1995 | Kordic | 99/432 |
| 5,417,996 | 5/1995 | Brink | 426/502 |
| 5,529,799 | 6/1996 | Bornhorst et al. | 426/549 |
| 5,560,946 | 10/1996 | Sanders et al. | 426/94 |

FOREIGN PATENT DOCUMENTS

| | | |
|---|---|---|
| 37 04 192 | 8/1988 | Germany . |
| 2 241 863 | 9/1991 | United Kingdom . |

*Primary Examiner*—Lien Tran
*Attorney, Agent, or Firm*—Brinks Hofer Gilson & Lione

[57] ABSTRACT

A method for making a laminated pizza crust is disclosed herein. The pizza crust is produced by resting a formulated dough mixture, cutting the dough, rolling the dough into a sheet, extruding high-melt margarine on to the sheet and folding it over the margarine to form a fatted dough, stretching the fatted dough, piling the fatted dough onto itself to create several layers, stretching the dough a second time, piling and rolling the dough again, stretching the dough a final time to a predetermined thickness, puncturing the dough sheet, cutting the dough sheet into pre-determined pizza shapes, and finally baking the shapes. The baked crust can be topped with pizza ingredients and frozen. Upon reheating by the consumer in either the microwave or a conventional oven, the crust exhibits an improved texture, flakiness, and flavor.

8 Claims, 2 Drawing Sheets

METHOD OF MAKING LAMINATED PIZZA CRUST

This application is a continuation of application Ser. No. 08/496,894, filed Jun. 30, 1995, now abandoned.

BACKGROUND OF THE INVENTION

This invention relates to baked products and methods for making them. In particular, the invention relates to a method of making a laminated dough pizza crust. The laminated dough pizza crust of the present invention demonstrates improved palatability and stability when heated in a microwave oven. Microwave ovens have provided a convenient means for heating a variety of frozen food products. Within this category of frozen food products, frozen store-bought pizzas continue to be a popular microwave-heatable item for consumers. These frozen pizzas offer the convenience of being heatable in either a conventional oven or a microwave oven. The crusts for these pizzas have traditionally been made from a simple yeast-based dough, similar to that used for making other bread products.

Frozen pizzas of the thin-crusted variety tend to be more generally favored if the crust has a crispy quality when cooked. These characteristics are easily accomplished in a conventional oven due to such an oven's direct surface heating and drying effects. In microwave ovens, however, excess moisture within the frozen crust often causes it to become soft and soggy. After prolonged exposure, the crust becomes tough and unpalatable, with the crumb of the crust becoming rubbery and gummy. Reducing the amount of time the crust is exposed to microwave energy is usually not a possibility, because the pizza toppings must be heated to a proper serving temperature. By the time the toppings are adequately heated, the crust can already be unpalatable.

Various attempts have been made to overcome the problems associated with exposure of pizza crusts to microwave energy. These improvements, however, have been only minimally successful. For example, dough formulas have been manipulated to make them homogeneously higher in shortening content and eggs. The inclusion of these additional ingredients slows the crust's absorption of microwave energy. These types of crusts do not have a pleasant taste or texture.

Other cures such as pre-cooking or pre-toasting have been attempted to reduce the amount of moisture in the bread product and thus alleviate the problems caused when the product is exposed to microwave energy. However, the pre-cooking can degrade the taste and instead create a dry, unappealing product. In the case of pizzas, the reduction of moisture in the pre-cooked crust becomes somewhat futile, because the low moisture is counteracted by the addition of the pizza toppings, such as tomato sauce, cheese, meats, and vegetables, all of which re-contribute moisture to the crust. Moreover, the pre-toasting adds an additional, expensive step to the entire pizza-making process.

Other methods for incorporating fat into pizza crusts have been developed to improve the overall texture of the crust. One method includes incorporating flakes of shortening or fat into a homogenous dough. This crust is not specifically formulated for improved microwavability, however, and such a crust does not adequately possess the flaky texture of traditionally cooked thin-crusted pizzas.

Finally, some dough products for commercial foods such as pies and pastries are made using a laminated dough. A laminated dough typically comprises thin layers of dough separated by either a layer of fat or a layer of dough of a differing type. These laminated doughs have previously been used for puffed, highly risen pastries, which have little value for thin pizza crusts. Pizza crusts have also been made from a pressed laminated dough, although the advantages of using a multiple-layer dough tend to be lost during the steps of pressing or stamping the dough into discs. The pressing or stamping homogenizes much of the layered structure.

SUMMARY OF THE INVENTION

It is therefore an object of the present invention to provide an improved frozen pizza crust that exhibits improved palatability and crispness when exposed to microwave energy.

It is another object of the present invention to provide a formulation for an improved frozen pizza crust that exhibits improved palatability and crispness when exposed to microwave energy.

It is still another object of the present invention to provide a system and method for making an improved frozen pizza crust that exhibits improved palatability and crispness when exposed to microwave energy.

In one aspect of the present invention, a laminated pizza crust is produced by resting a formulated dough mixture, cutting the dough, rolling the dough into a sheet, extruding high-melt margarine on to the sheet and folding the dough over the margarine to form a fatted dough, stretching the fatted dough, piling the fatted dough onto itself to create several layers, stretching the dough a second time, piling and rolling the dough again, stretching the dough a final time to a predetermined thickness, puncturing (docking) the dough sheet, cutting the dough sheet into pre-determined pizza shapes, and finally baking the shapes. The baked, laminated crusts can be topped with pizza ingredients and frozen. Upon reheating by the consumer in either the microwave or a conventional oven, the crust exhibits an improved texture, flakiness, and flavor.

In another aspect of the present invention, an apparatus for making pizza crusts includes a mixer for combining ingredients into a dough, a roller for rolling the dough into a sheet, a folder for incorporating a layer of margarine into the sheet, a first stretcher for rolling the sheet, a first piler for layering the sheet to create a first layered sheet, a second stretcher for rolling said first layered sheet, a second piler for layering said first layered sheet to create a second layered sheet, a third stretcher for rolling the second layered sheet, cutters for dividing the second layered sheet into pieces, a docker for puncturing holes in the pieces, and at least one oven for baking the pieces.

These and other features and advantages of the invention will become apparent upon the review of the following detailed description of the presently preferred embodiments of the invention, taken in conjunction with the appended figures.

DESCRIPTION OF THE DRAWINGS

The invention will be explained with reference to the drawings, in which.

DETAILED DESCRIPTION OF THE INVENTION AND THE PRESENTLY PREFERRED EMBODIMENT

In accordance with the present invention, the method for making the laminated pizza crust is shown generally in FIG.

1. After ingredients for the dough are mixed (10–11), the dough is allowed to rest a period of time (12). After this resting period, a sheeting and laminating process (13) is performed on the rested dough to produce a layered sheet of dough and fat. When the laminated dough is of the proper thickness and comprises the desired number of layers, the dough is "docked" or punctured with holes to prevent ballooning of the dough, and cut into pizza-sized portions (14). Finally, the portions are baked in ovens (15).

The following example shows the ingredients used in the manufacture of a pizza crust in accordance with the present invention. The crust mixture which is used in the preparation of the laminated crust includes approximately 60% by weight of a flour having a protein content of approximately 11%. 1.25% by weight of active dry yeast is also added, along with 1.25% salt, 1.25% sugar, 1.25% uncolored, solid margarine, and 32% water at a temperature between 50 and 60 degrees F (all percentages are by weight of total dough). A dough conditioner is added in a quantity of about 3% by weight. The conventional dough conditioner, preferably of the type manufactured by Microgold, stabilizes the mixture. A table summary of these ingredients in an example batch (quantitized by weight of ingredients) is listed below.

| INGREDIENTS (example) | |
| --- | --- |
| Ingredient | Pounds |
| Flour - 11% Protein | 100 |
| Yeast - Dry Instant Active | 2 |
| Sugar | 2 |
| Margarine - Uncolored, Solid | 2 |
| Water | 52 |
| Microgold Dough Conditioner | 5 |
| Hi-melt Margarine Roll-In % | 10% |

Figure 1:
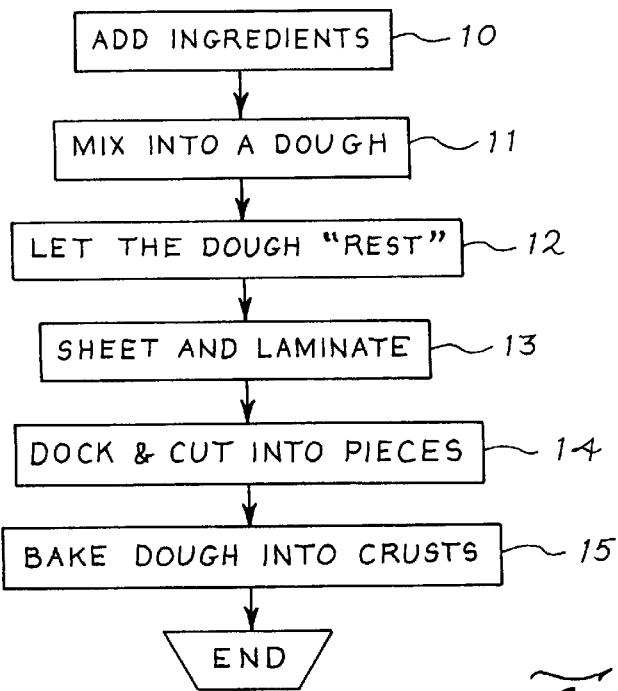
FIG. 1 shows a high-level flowchart of the process for making the pizza crust of the present invention.
Figure 2:
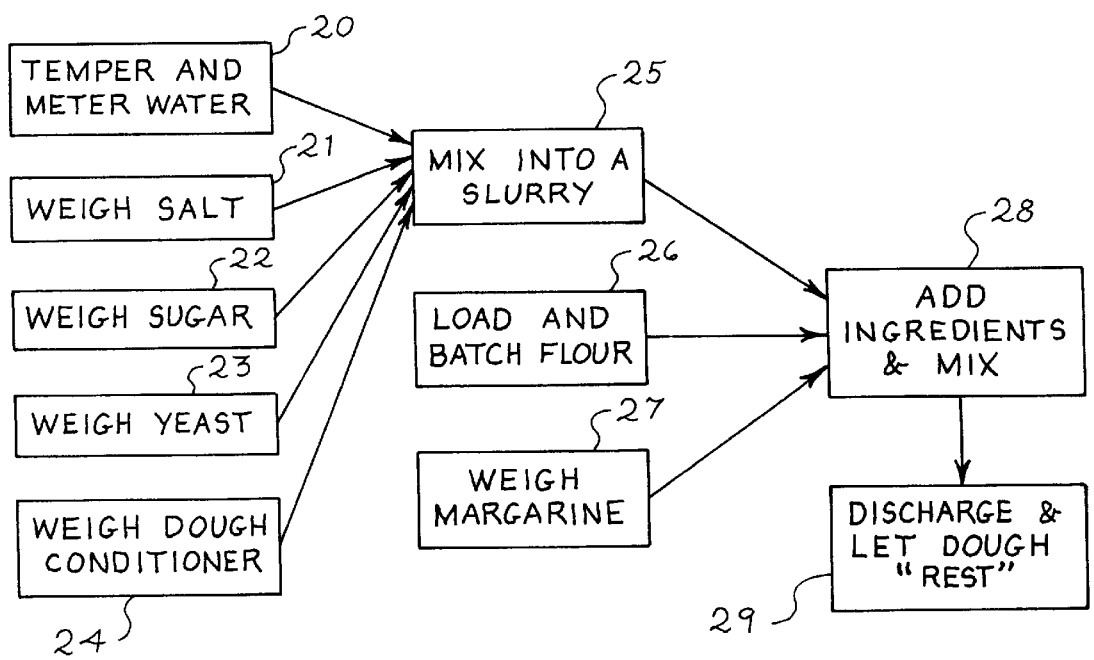
FIG. 2 shows a high-level flowchart of the process for producing the dough mixture used in the present invention.

As shown in the flow diagram of FIG. 2, the ingredients are first weighed (boxes 20–24 in the flow diagram), and the water, salt, sugar, yeast, and dough conditioner are mixed into a slurry (25). The water used at step 20 is filtered water brought to the specified temperature. The slurry solution is then mixed and pumped to a use tank. The measured flour, slurry, and margarine are then loaded (26–27) and mixed together (28). The mixing occurs at high speed for 2 to 3 minutes until a preferred target temperature of approximately 80–89 degrees F is reached. After mixing, the dough is discharged onto an incline conveyor belt and conveyed slowly for 45 minutes to 1 hour (29 in FIG. 2, 12 in FIG. 1). This "resting" or "airing" stage allows the yeast in the dough to activate and cause the dough to rise.

Figure 3:
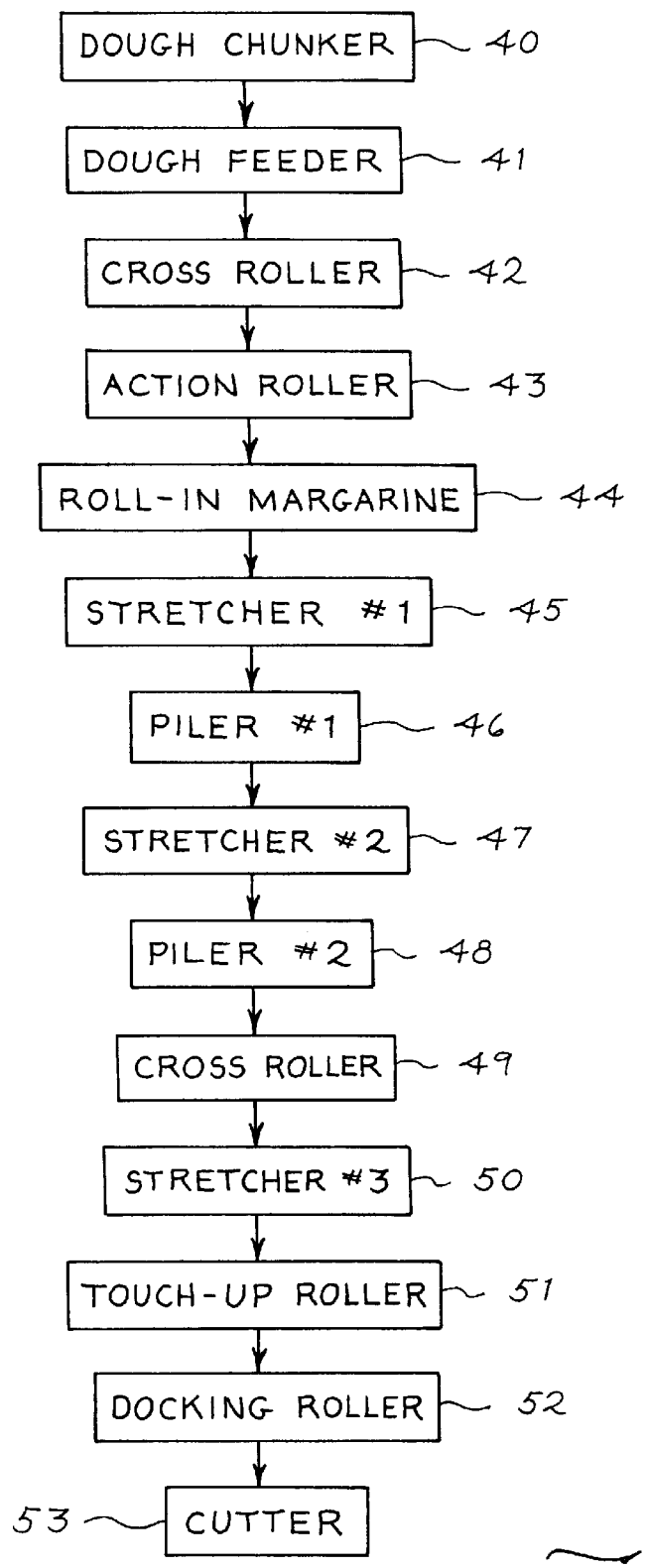
FIG. 3 shows a detailed flowchart of the sheeting and laminating process used in the present invention.

As shown in FIG. 1, following the resting period 12 the sheeting and laminating process 13 is performed on the dough. This process is illustrated by the flow diagram of FIG. 3. As shown in this figure, various cutting, rolling, and stretching operations are performed.

At box 40 in the flow diagram, a dough chunker divides the dough into approximately 60 pound chunks in order to properly load a dough feeder. At 41, the dough feeder receives the chunks of dough dumped into a hopper. The conventional feeder uses a belt and cutting blade to deposit overlapping dough strips on a moving conveyor. The line of strips measures 35–50 mm thick and 480–570 mm wide. A roller is next run across the overlapped dough to spread and even the distribution of the dough (42). The dough is then run through three sets of rollers to gently work it into a thin sheet 6.5–8 mm thick (43).

High-melt margarine at a temperature between 65 and 71 degrees F is extruded through a rectangular nozzle into a strip on the middle third section of the dough sheet (44). The quantity of margarine added by weight is equal to 10% of the total weight of the dough. The outer portions of the dough are then folded in overlapping thirds, thus sandwiching the margarine in the middle of the dough and forming a fatted dough.

The fatted dough is then stretched by a first stretcher at 45. In this operation, a series of rollers are rotated in a circular fashion. The dough passes underneath these rollers on three different conveyors at a speed determined by a speed ratio setting. This setting in combination with the clearance between the rollers and the belt determines the final thickness of the dough after the rolling.

As shown in box 46, the fatted dough is "piled" by a first piler to create a first series of layers. The piler travels back and forth distributing the dough onto a conveyor belt situated at a 90 degree angle from the direction of feed. The conveyor is thus loaded with a sheet of dough having overlapping folds. The number of folds across the width of the dough sheet is multiplied by two to determine the number of layers presently in the dough. The dough is then stretched by a second stretcher at 47 into a fatted sheet, and piled by a second piler at 48 to create a layered sheet having a thickness between 15 and 20 mm. At this point, the dough has its final sixteen-layer structure. The dough is then smoothed by a cross roller at 49. Finally, at 50, a third stretcher rolls the dough to a final thickness of 3–5 mm.

In order to determine the total number of layers the dough will eventually have, the number of layers present after the first piler is multiplied by the number of layers present after the second piler. For example, if 4 layers are run after the first piler and 4 layers are run after the second piler, the dough sheet will have a total of 16 layers.

After the final thickness is achieved, the dough sheet is cut into six strips for rectangular pizza shapes. For other pizza shapes, the dough is left intact and lightly smoothed by a touch-up roller at 51.

The dough is then "docked" or punctured at 52 to prevent the dough from expanding or "ballooning" in the oven. The puncturing is performed by a roller with a large number of projecting pins to punch a pattern of holes through the dough. At 53, the dough is put into its final form by a cutter, which cuts the dough into pizza shapes. The shapes are spaced evenly on a conveyor to promote even baking.

The cut dough shapes are then baked into crusts in gas impingement ovens set between 475 and 550 degrees F for 1.5–2.3 minutes.

The dough conveying system used in the above-described process is preferably a Model 710 manufactured by Stephan Machinery. The high-speed dough mixer is a Model TK160, also preferably manufactured by Stephan. The sheeting and laminating system preferably comprises components manufactured by Rheon, and include the following components and model numbers: Surface Cleaner Model SV013, Sheet Folder Model FF111, Stress Free Stretcher Model SM231, Flour Duster Model DF103, Dough Feeder Model EX050, Underneath Conveyor Model PC502, CWC Cross Action Roller Model M103, Fat Pump Model XC230, Roll-In Conveyor Model WC303, Sheet Folder Model FF101, Stress-Free Stretcher Model SM501, Pile-Up Table Model PC011, Parallel Piler Model LM608, Pile-Up Table Model PC103, Cross Roller Model CM523, Flour Sweeper Model FV376, Stress-Free Stretcher Model SM318, Circular Cutter Model OK833, Spacing Conveyor Model 2C672, Press Roller Model MR308, Single Rotary Cutter Frame Model RK013, Synchronized Conveyor Model MC013, and Guillotine Cutter Model GK013. The various ranges settings for these devices are shown in the table below.

PREFERRED RANGES AND SETTINGS FOR EQUIPMENT

|  | Low | High |
|---|---|---|
| Mixer | | |
| Mix Time (seconds) | 100 | 180 |
| Dough Chunker | | |
| Intervals per minute | 2 | 5 |
| Dough Feeder | | |
| Flour Setting #1 (Beginning of Line) | 10 | 30 |
| Dough Intervals | 230 | 280 |
| Flour Setting #2 (Before Cross Roller) | 10 | 30 |
| Cross Roller Gage (mm) | 15 | 30 |
| Action Roller | | |
| Flour Setting #3A (Top of Action Roller) | 0.5 | 1.5 |
| Flour Setting #3B (Bottom of Action Roller) | 10 | 30 |
| Roller Gage (mm) | 4 | 7 |
| Set Dough Width (mm) | 650 | 725 |
| Output Belt Speed (m/min) | 1.00 | 2.75 |
| Stretch Ratio | 2 | 4 |
| Roll-In | | |
| Belt Speed (m/min) | 1.0 | 2.8 |
| Screw Speed (rpm) | 0.2 | 0.4 |
| Stretcher #1 | | |
| Flour Setting #4A (Top of Stretcher #1) | 20 | 35 |
| Flour Setting #4B (Bottom of Stretcher #1) | 10 | 30 |
| No. 1 Belt Speed/Incline Angle | 1.0/15 deg. | 2.75/40 deg. |
| Speed Ratio | 2.5 | 4.5 |
| Roller Clearance (mm) | 0.8 | 2.0 |
| Number of layers after Piler #1 | 4 | 6 |
| Folding Width (mm) | 25/25 | 40/40 |
| Piler Belt Speed | 300 | 700 |
| Flour Setting #5 (After Piler #1) | 10 | 20 |
| Stretcher #2 | | |
| Flour Setting #6A (Top of Stretcher #1) | 10 | 40 |
| Flour Setting #6B (Bottom of Stretcher #1) | 15 | 35 |
| Gage (mm) | 1 | 3 |
| Speed Ratio | 2.0 | 6.0 |
| Input Thickness (mm) | 15 | 25 |
| Belt #1 Speed (m/min) | 1 | 3 |
| Number of layers after Piler #2 | 4 | 6 |
| Folding Width (mm) | 650 | 700 |
| Piler Belt Speed | 4 | 12 |
| Flour Setting #7 | 1 | 3 |
| Flour Setting #8 (After Piler #2) | 0.8 | 2 |
| Stretcher #3 | | |
| Flour Setting #9A (Top of Stretcher #3) | 1 | 2.5 |
| Flour Setting #9B (Bottom of Stretcher #3) | 10 | 50 |
| Belt #1 Speed (m/min) | 0.5 | 2.5 |
| Speed Ratio | 2 | 5 |
| Crank Clearance (mm) | 1 | 5 |
| Guillotine Cutter (for rectangular shapes) | | |
| Cut Length (mm) | 150 | 170 |
| Gas Impingement Oven | | |
| Bake Time (minutes) | 1.5 | 2.3 |
| Oven #1 Temp (deg. F.) | 500 | 550 |
| Oven #1 Fan (% of maximum) | 40 | 60 |
| Oven #1 Height (inches) | 1.5 | 3.5 |
| Oven #2 Temp (deg. F.) | 475 | 525 |
| Oven #2 Fan (% of maximum) | 50 | 80 |
| Oven #2 Height (inches) | 1.5 | 4.5 |
| Baffles (Top/Bottom) | 50/50 | 80/20 |

The preferred parameters for various dough dimensions and temperatures are summarized below. These ranges are useful when the process of the present invention is performed on alternative equipment. The present invention is not limited to these parameters, although those listed have been found to be optimal for the equipment used.

PREFERRED MEASUREMENT PARAMETERS

|  | Low | High |
|---|---|---|
| Room Temperature (deg. F.) | 60 | 70 |
| Formula Water Temperature (deg. F.) | 50 | 65 |
| Yeast Solution Temperature (deg. F.) | 50 | 65 |
| Dough Temperature after mix (deg. F.) | 80 F. | 89 F. |
| Dough Width after feeder (W1 - mm) | 480 | 570 |
| Dough Thickness (T1 - mm) | 35 | 50 |
| Dough Temperature (deg. F.) | 75 F. | 85 F. |
| Dough Width before butter roll-in (W2 - mm) | 650 | 800 |
| Dough Thickness before butter roll-in (T2 - mm) | 6.5 | 8 |
| Roll-In Temperature (deg. F.) | 65 F. | 71 F. |
| Dough Width after butter roll-in (W3 - mm) | 280 | 320 |
| Dough Thickness after butter roll-in (T3 - mm) | 20 | 30 |
| Dough Width after stretcher #1 (W4 - mm) | 300 | 400 |
| Dough Width after 1st Piler (W5 - mm) | 300 | 350 |
| Dough Thickness after 1st Piler (T5 - mm) | 12 | 25 |
| Dough Width after stretcher #2 (W6 - mm) | 250 | 350 |
| Dough Width after 2nd Piler (W7 - mm) | 600 | 700 |
| Dough Thickness after 2nd Piler (T7 - mm) | 15 | 20 |
| Dough Width after stretcher #3 (W8 - mm) | 600 | 700 |
| Final Dough Thickness (T8 - mm) | 3 | 5 |
| Cut Width (W9 - mm)(for rectangular shapes) | 110 | 120 |
| Cut Length (L9 - mm)(for rectangular shapes) | 148 | 160 |

After the crusts are baked, they are cooled for a period of time before traditional pizza toppings are applied.

The various stretching and rolling procedures result in a unique 16-layer laminated pizza crust with excellent taste and texture. The crusts are crispy and flaky, and are able to withstand topping, freezing, and microwaving without any significant degradation in these qualities.

Of course, it should be understood that a wide range of changes and modifications can be made to the embodiment of the method described above. For example, variations in the ingredients, temperature parameters, layering steps, or other parameters may be applied while remaining within the contemplated scope of the invention. It is therefore intended that the foregoing detailed description be regarded as illustrative rather than limiting and that it be understood that it is the following claims, including all equivalents, which are intended to define the scope of this invention.

What is claimed is:

1. A method for making multi-layered, laminated pizza crusts, said method comprising the sequential steps of:

providing a dough product;

proofing said dough product;

forming said dough product into a sheet using a plurality of first rolling means;

extruding a margarine layer onto said sheet;

folding said sheet over said margarine layer to form a fatted dough;

stretching said fatted dough into a fatted sheet using a first stretching means, said first stretching means including a series of rollers applied to said fatted dough;

distributing said fatted sheet onto a conveyor using a first piling means to overlap said fatted sheet on said conveyor;

reforming said fatted sheet to a predetermined thickness;

wherein said folding, stretching, distributing and reforming steps produce a folded dough having a plurality of margarine layers distributed between layers of dough;

puncturing said fatted sheet;

cutting said fatted sheet into pieces; and baking said pieces.

2. The method of claim 1 wherein the step of reforming said fatted sheet to a predetermined thickness further comprises the sequential steps of:

stretching said fatted sheet using a second stretching means, said second stretching means including a series of rollers;

distributing said fatted sheet onto a conveyor using a second piling means to overlap said fatted sheet on said conveyor; and rolling said fatted sheet to a predetermined thickness using a plurality of second rolling means.

3. The method of claim 1 wherein said first stretching means further comprises a series of rollers that are mounted for rotation over a conveyor.

4. A method for making a pizza having topping ingredients and a multi-layered, laminated pizza crust, said method comprising the sequential steps of:

providing a dough product;

proofing said dough product;

forming said dough product into a sheet using a plurality of first rolling means;

extruding a soft, margarine layer onto said sheet using extruding means, the quantity of said margarine layer extruded being equal to ten percent of the total weight of the dough product;

manipulating said sheet and said margarine to produce a folded dough having a plurality of margarine layers distributed between layers of said dough product;

rolling said folded dough into a sheet of predetermined thickness;

cutting said sheet into a pizza size piece;

baking said piece in an oven; and applying said topping ingredients to said piece.

5. The method of claim 4 wherein said step of manipulating said sheet and said margarine further comprises the sequential steps of:

folding said sheet over said margarine layer to form a fatted dough;

stretching said fatted dough into a fatted sheet using a first stretching means, said first stretching means including a series of rollers applied to said fatted dough;

distributing said fatted sheet onto a conveyor using a first piling means to overlap said fatted sheet on said conveyor; and reforming said fatted sheet to a predetermined thickness.

6. The method of claim 5 further comprising the step of puncturing said sheet after said step of cutting said sheet into a pizza size piece.

7. The method of claim 6 wherein said first stretching means further comprises a series of rollers that are mounted for rotation over a conveyor.

8. The method of claim 7 wherein said dough product further comprises approximately 60 percent flour, 1.25 percent margarine and 32 percent water.

* * * * *